United States Patent [19]

Chrzanowski

[11] Patent Number: 4,703,937
[45] Date of Patent: Nov. 3, 1987

[54] SELF-VENTING SEAL ASSEMBLY FOR RELATIVELY MOVABLE MEMBERS

[75] Inventor: Richard S. Chrzanowski, Rockford, Ill.

[73] Assignee: MTE Hydraulics, Inc., Rockford, Ill.

[21] Appl. No.: 800,302

[22] Filed: Nov. 21, 1985

[51] Int. Cl.$^4$ .............................................. F16J 15/24
[52] U.S. Cl. ...................................... 277/29; 277/177; 277/180; 277/188 A
[58] Field of Search ................ 277/29, 165, 173, 176, 277/177, 180, 188 A

[56] References Cited

U.S. PATENT DOCUMENTS

| | | | |
|---|---|---|---|
| 2,391,577 | 12/1945 | Larson | 308/187.1 |
| 2,843,434 | 7/1958 | Orloff et al. | 309/23 |
| 3,573,870 | 4/1971 | Gastineau | 277/180 X |
| 3,741,615 | 6/1973 | Otto | 308/187.1 |
| 4,210,405 | 7/1980 | Jesswein | 277/29 X |
| 4,244,553 | 1/1981 | Escobosa | 277/29 X |
| 4,253,713 | 3/1981 | Chambers, Sr. | 308/187.1 |
| 4,426,090 | 1/1984 | Bender | 277/27 |
| 4,428,630 | 1/1984 | Folger et al. | 308/187.2 |

FOREIGN PATENT DOCUMENTS

| | | | |
|---|---|---|---|
| 587720 | 1/1959 | Italy | 277/180 |
| 530223 | 12/1940 | United Kingdom | 277/173 |

Primary Examiner—Robert S. Ward
Attorney, Agent, or Firm—Leydig, Voit & Mayer, Ltd.

[57] ABSTRACT

An O-ring is positioned with its inner peripheral surface in sealing engagement with a shaft and with its outer peripheral surface in sealing engagement with the wall of a cylindrical hole. When pressure is applied to the high pressure end of the O-ring, the low pressure end thereof is pressed against a radially extending retaining disc. An axially extending vent hole is formed through the outer portion of the retaining disc to permit fluid adjacent the outer peripheral surface of the low pressure end of the O-ring to escape so that such fluid cannot exert radially inward pressure forcing the inner peripheral surface of the O-ring into tight frictional engagement with the shaft. A wire ring disposed adjacent the vent hole prevents the compressed O-ring from extruding into and plugging the vent hole.

10 Claims, 4 Drawing Figures

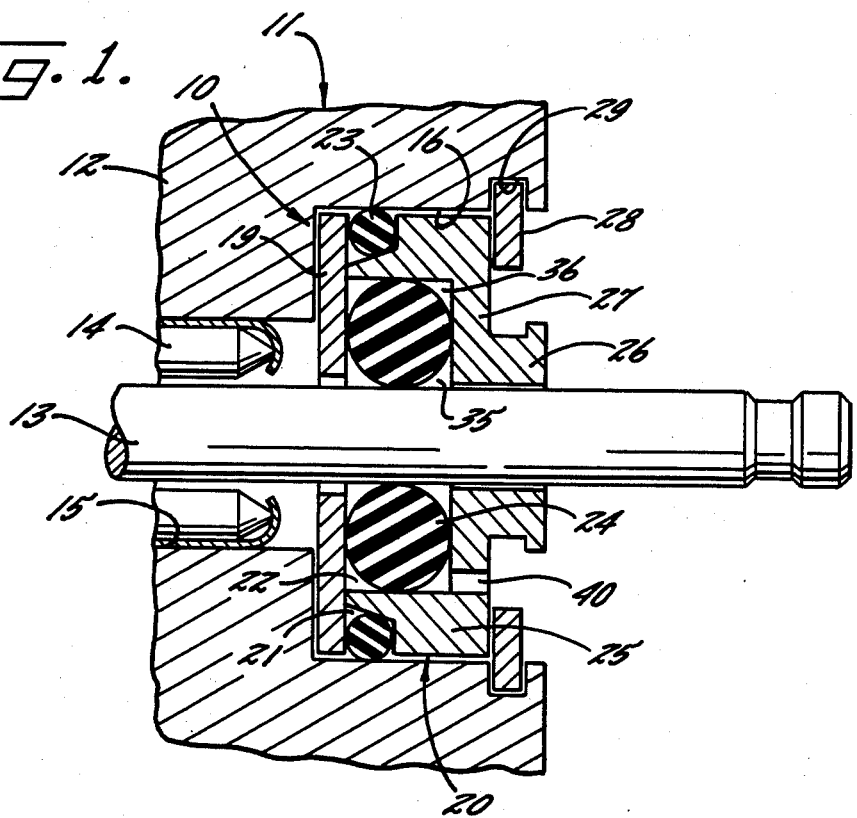
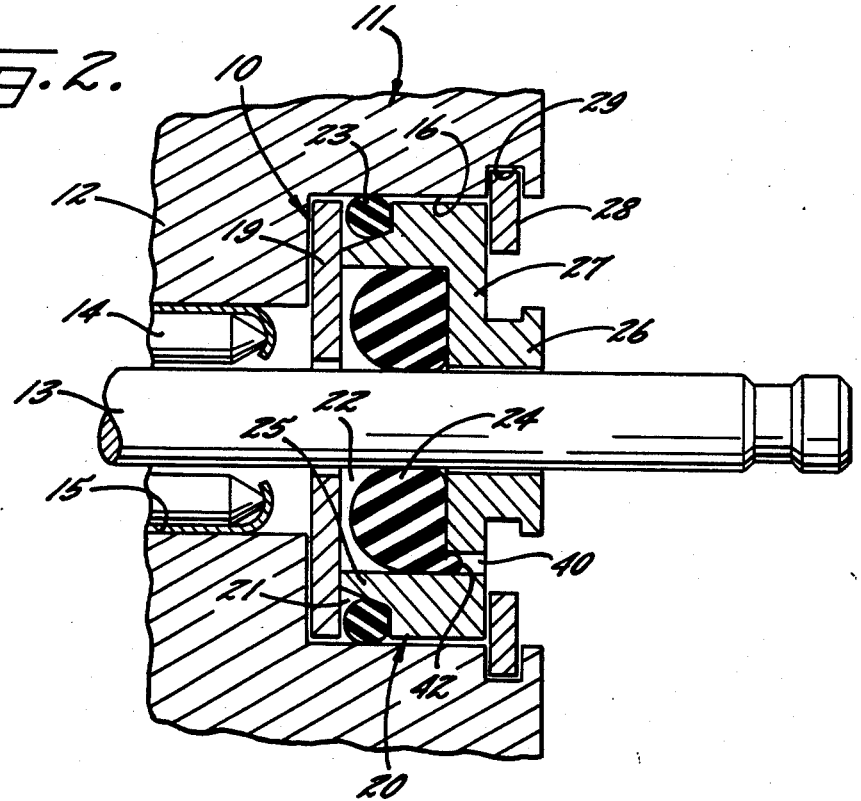

_4,703,937_

SELF-VENTING SEAL ASSEMBLY FOR RELATIVELY MOVABLE MEMBERS

BACKGROUND OF THE INVENTION

This invention relates to a seal assembly for establishing a fluid-tight seal between two relatively movable members, one of which may be an inner rod or shaft. More specifically, the invention relates to a seal assembly in which the sealing element is in the form of a ring made of elastomeric material such as, for example, an O-ring.

Typically, the inner peripheral surface of the sealing ring sealingly engages the shaft member while the outer peripheral surface of the sealing ring seals against an outer member which encircles the shaft. When pressure is applied to the high pressure end of the sealing ring, the ring is compressed and its low pressure end is pressed axially against a radially extending retainer which backs the low pressure end of the sealing ring.

In conventional sealing assemblies, fluid is trapped in the vicinity of the outer peripheral surface of the low pressure end of the sealing ring and tends to be compressed when pressure is applied to the high pressure end of the ring to press the ring axially against the retainer. The pressure exerted radially by the trapped fluid forces the inner peripheral surface of the sealing ring radially into tight gripping engagement with the shaft. When there is relative movement between the shaft and the seal, the high radial loads caused by the trapped fluid result in friction and heat which increases the wear and reduces the service life of the sealing ring.

SUMMARY OF THE INVENTION

The general aim of the present invention is to increase the service life of a sealing ring disposed between two relative movable members by reducing the heat and frictional loads resulting from trapped fluid forcing the ring radially inwardly into gripping engagement with the inner member.

A more detailed object of the invention is to achieve the foregoing by venting fluid from the vicinity of the outer peripheral surface of the low pressure end of the sealing ring so as to prevent such fluid from forcing the inner peripheral surface of the ring radially inwardly into tight gripping engagement with the inner shaft.

Still another object is to house the sealing ring in a unique retainer having a vent hole for permitting fluid to escape out of the retainer in the vicinity of the outer peripheral surface of the low pressure end of the ring.

A further object is to provide novel means for preventing the compressed sealing ring from extruding into and closing off the vent hole.

These and other objects and advantages of the invention will become more apparent from the following detailed description when taken in conjunction with the accompanying drawings.

BRIEF DESCRIPTION OF THE DRAWINGS

FIG. 1 is a fragmentary cross-sectional view taken axially through a typical device equipped with one embodiment of a new and improved seal assembly incorporating the unique features of the present invention, the sealing ring of the seal assembly being shown in a relaxed condition.

FIG. 2 is a view similar to FIG. 1 but shows the sealing ring in a compressed condition.

DETAILED DESCRIPTION OF THE PREFERRED EMBODIMENTS

Figure 3:
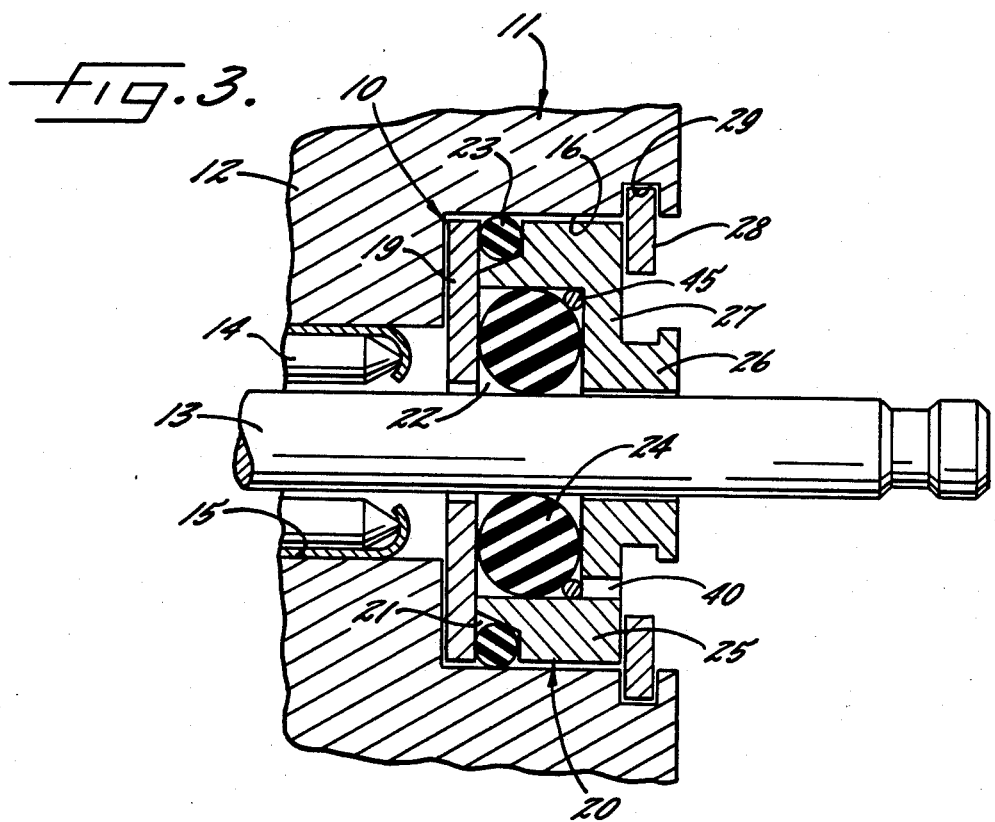
FIG. 3 is also a view similar to FIG. 1 but shows a modified seal assembly with the sealing ring in a relaxed condition.

For purposes of illustration, the sealing assembly 10 of the invention is shown in the drawings in connection with a device such as a hydraulic motor 11 having an outer member or housing 12 and an inner member or shaft 13. In this particular instance, the shaft is supported to rotate within the housing by a bearing assembly 14 supported in a bore 15 in the housing. Instead of rotating, the shaft could slide back and forth relative to the housing.

The seal assembly 10 is located within a counterbore 16 at the end of the housing 12 and serves to prevent high pressure oil in the bore 15 from leaking along the shaft 13 toward the free end thereof. The present seal assembly includes a spacer washer 19 disposed adjacent the bottom of the counterbore 16 and loosely encircling the shaft. A retainer 20 coacts with the washer 19 to define annular grooves 21 and 22 for elastomeric sealing rings 23 and 24, respectively. The retainer includes a sleeve-like member 25 defining a circular hole or bore and further comprises a hub member 26 formed with a radially extending retaining disc 27. The hub 26 and the disc 27 loosely encircle the shaft 13. A snap ring 28 is expanded into a groove 29 in the housing 12 and engages the outboard side of the disc 27 to captivate the washer 19 and the retainer 20 in the counterbore 16. The retainer 20 consisting of the sleeve member 25, the hub member 26 and the disc member 27 preferably is of one-piece construction.

The sealing ring 23 is an O-ring disposed in the groove 21 and operable to prevent high pressure oil from leaking along the wall of the counterbore 16. In the present instance, the sealing ring 24 also preferably is an O-ring whose inner peripheral surface seals against the rotary shaft 13. The outer peripheral surface of the O-ring 24 seals against the wall of the hole of the sleeve 25.

Figure 4:
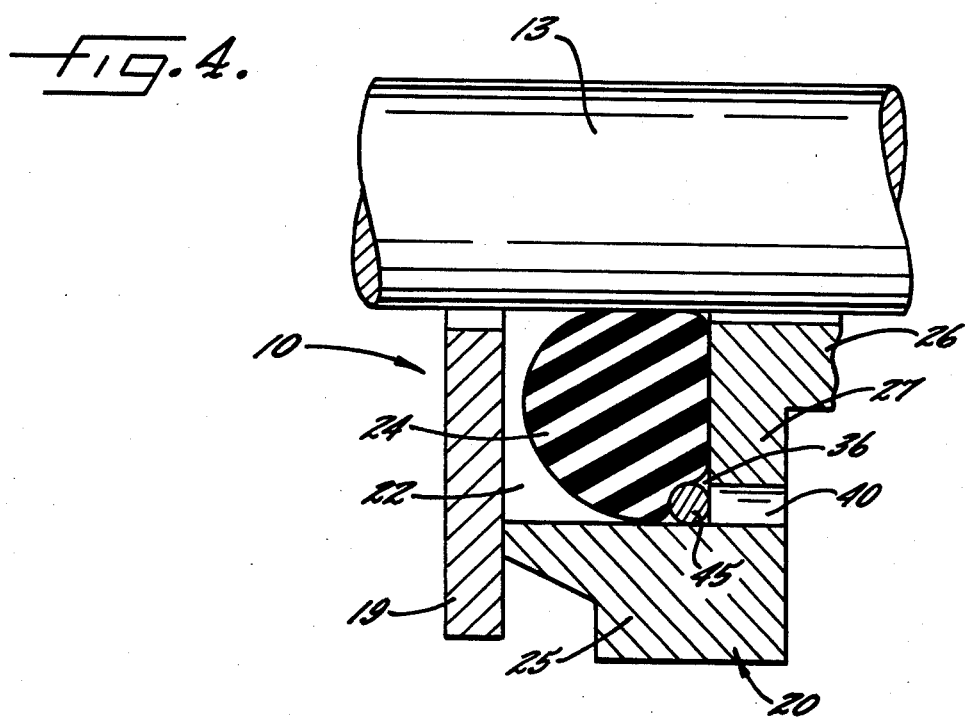
FIG. 4 is an enlarged view showing the sealing ring of the modified seal assembly in a compressed condition.

When the bore 15 is not pressurized with oil, the O-ring 24 is in a relaxed condition as shown in FIGS. 1 and 3 and its peripheral surfaces are substantially tangent to the shaft 13, the washer 19, the wall of the hole in the sleeve 25, and the retaining disc 27. When the bore 15 is pressurized with oil at high pressure, pressure is applied to the left or high pressure end of the O-ring 24, and compresses the ring axially as shown in FIGS. 2 and 4. As a result, the ring 24 is elastically deformed and is pressed axially against the retainer disc 27, the ring subtantially filling the two substantially triangular spaces 35 and 36 (FIG. 1) previously existing adjacent the right or low pressure end of the ring. Air and any leakage oil in the space 35 escapes therefrom in a conventional manner by way of the annular clearance between the shaft 13 and the hub 26.

In accordance with the present invention, fluid is allowed to escape from the space 36 through a vent hole 40 in the retainer 20. As a result of air and any leakage oil being vented through the hole 40, such fluid is not trapped and pressurized in the space 36 and does not force the inner periphery of the O-ring 24 radially inwardly into tight gripping engagement with the shaft 13. Thus, radial loads between the sealing ring and the shaft are reduced so as to reduce friction, heat and wear and to increase the service life of the seal.

In this specific instance, the vent hole 40 is formed axially through the radially extending disc 27 of the retainer 20 and communicates directly with the space 36. Thus, the vent hole is located in the vicinity of the area occupied by the outer peripheral surface of the low pressure end of the O-ring 24. Instead of being formed through the disc 27, the vent hole 40 could be formed through the sleeve member 25 in a position to communicate with the space 36. Also, angularly spaced vent holes could be provided.

When the O-ring 24 is compressed by high pressure oil in the bore 15, a portion of the low pressure end of the O-ring tends to extrude into the vent hole 40 as indicated at 42 in FIG. 2 after the space 36 has been vented. This tends to key the O-ring to the retainer 20 so as to help further in preventing slipping of the O-ring during rotation of the shaft 13.

In some applications, it is important to keep the vent hole 40 open at all times and to prevent the O-ring 24 from extruding into and plugging the vent hole. For this purpose, a means which herein is in the form of a ring 45 (FIGS. 3 and 4) of round wire may be placed in the space 36 between the low pressure end of the O-ring 24 and the retainer disc 27. The wire 45 allows the hole 40 to remain sufficiently open for venting purposes but prevents the O-ring from extruding into and closing the hole.

From the foregoing, it will be apparent that the present invention brings to the art a new and improved seal assembly 10 in which the vent hole 40 prevents trapped fluid from forcing the O-ring 24 into tight gripping engagement with the shaft 13 when the high pressure end of the seal is subjected to high pressure oil. Thus, friction and heat are reduced so as to increase the useful life of the O-ring. Those skilled in the art will appreciate that the principles of the invention are also applicable to an arrangement in which an O-ring is designed to turn or slide on a stationary shaft. In such a case, the vent hole prevents fluid in the space from being pressurized and causing the O-ring to tightly grip the stationary shaft.

I claim:

1. A seal assembly for establishing a fluid-tight seal between relatively movable inner and outer members, the inner member being a shaft, said seal assembly comprising an annular seal made of elastomeric material, said seal having an inner peripheral surface disposed in sealing engagement with said shaft and having an outer peripheral surface disposed in sealing engagement with said outer member, said seal having a high pressure end and a low pressure end, a radially extending retainer disposed in engagement with the low pressure end of said seal and axially backing the low pressure end of the seal when the seal is compressed by pressure applied to the high pressure end of the seal, a vent opening extending through one of said retainer and said outer member adjacent the area occupied by the outer peripheral surface of the low pressure end of said seal thereby to permit fluid in the vicinity of said area to escape when the seal is compressed and to prevent such fluid from causing said seal to frictionally grip said shaft, and means located between said retainer and the low pressure end of said seal and engageable with the low pressure end of the seal to prevent the seal from extruding into and closing off said vent opening when said seal is compressed by pressure applied to the high pressure end of the seal.

2. A seal assembly as defined in claim 1 in which said vent opening extends axially through said retainer.

3. A seal assembly for establishing a fluid-tight seal between an inner shaft supported to move within an outer member, said seal assembly comprising an annular seal made of elastomeric material, said seal having an inner peripheral surface disposed in sealing engagement with said shaft and having an outer peripheral surface disposed in sealing engagement with said member, said seal having a high pressure end and a low pressure end, a radially extending retainer disposed in engagement with the low pressure end of said seal and axially backing the low pressure end of the seal when the seal is compressed by pressure applied to the high pressure end of the seal, a vent opening extending through one of said retainer and said member adjacent the area occupied by the outer peripheral surface of the low pressure end of said seal thereby to permit fluid in the vicinity of said area to escape when the seal is compressed and to prevent such fluid from causing said seal to frictionally grip said shaft, and means located between said retainer and the low pressure end of said seal and engageable with the low pressure end of the seal to prevent the seal from extruding into and closing off said vent opening when said seal is compressed by pressure applied to the high pressure end of the seal.

4. A seal assembly as defined in claim 3 in which said means comprises a ring which encircles the outer peripheral surface of the low pressure end of said seal.

5. A seal assembly as defined in claim 4 in which said ring is made of round wire, said seal being an O-ring.

6. A seal assembly as defined in claim 3 in which said vent hole extends axially through said retainer.

7. A seal assembly as defined in claim 6 in which said outer member and said retainer are of one-piece construction.

8. A seal assembly for establishing a fluid-tight seal between relatively movable inner and outer members, said seal assembly comprising an annular seal made of elastomeric material, said seal having inner and outer peripheral surfaces disposed in sealing engagement with said inner and outer members, repsectively, said seal having a high pressure end and a low pressure end, a retainer disposed in engagement with the low pressure end of said seal and backing the low pressure end of the seal when the seal is compressed by pressure applied to the high pressure end of the seal, a vent opening extending through said retainer to permit fluid adjacent the low pressure end of the seal to escape through said retainer when the seal is compressed, and means located between the low pressure end of said seal and said vent opening and engageable with the low pressure end of the seal for preventing the seal from extruding into and closing off the vent opening when the seal is compressed.

9. A seal assembly for establishing a fluid-tight seal between an inner cylindrical shaft supported for rotation within a cylindrical hole formed in an outer member, said seal assembly comprising an O-ring made of elastomeric material, said O-ring having an inner peripheral surface disposed in sealing engagement with said shaft and having an outer peripheral surface disposed in sealing engagement with the cylindrical wall of said hole, said O-ring having a high pressure end and a low pressure end, a radially extending retainer disc encircling said shaft and disposed in engagement with the low pressure end of said O-ring to axially back the low pressure end of the O-ring when the O-ring is compressed by axial pressure applied to the high pressure end of the O-ring, a vent opening extending axially through said retainer disc adjacent the area occupied by the outer peripheral surface of the low pressure end of said O-ring thereby to permit fluid in the vicinity of said area to escape through the retainer disc when the O-ring is compressed and to prevent such fluid from causing said O-ring to frictionally grip said shaft, and a ring encircling the outer peripheral surface of the low pressure end of said O-ring and disposed between said O-ring and said retainer disc to prevent the O-ring from extruding into and closing off said vent opening when said O-ring is compressed by pressure applied to the high pressure end of the O-ring.

10. A seal assembly as defined in claim 9 in which said outer member and said retainer disc are of one-piece construction.

* * * * *